United States Patent
Ramamurthy et al.

(10) Patent No.: US 8,415,909 B2
(45) Date of Patent: Apr. 9, 2013

(54) POWER CONTROL ON A MULTI-MOTION ELECTRIC DRIVE SYSTEM

(75) Inventors: Shyam Sunder Ramamurthy, Louisville, KY (US); Timothy Ray Jackson, Louisville, KY (US); Richard Francis Whalen, Jr., Prospect, KY (US)

(73) Assignee: General Electric Company, Schenectady, NY (US)

( * ) Notice: Subject to any disclaimer, the term of this patent is extended or adjusted under 35 U.S.C. 154(b) by 427 days.

(21) Appl. No.: 12/765,008

(22) Filed: Apr. 22, 2010

(65) Prior Publication Data
US 2011/0260667 A1 Oct. 27, 2011

(51) Int. Cl.
*H02K 17/32* (2006.01)

(52) U.S. Cl. .................. 318/434; 318/432; 318/433

(58) Field of Classification Search .......... 318/434, 318/432, 433, 34, 801, 798, 609, 610, 611, 318/599
See application file for complete search history.

(56) References Cited

U.S. PATENT DOCUMENTS

| | | | |
|---|---|---|---|
| 4,263,535 A | 4/1981 | Jones | |
| 6,239,575 B1 | 5/2001 | Xu et al. | |
| 6,831,429 B2 | 12/2004 | Fu | |
| 2006/0212168 A1* | 9/2006 | Baba et al. | 700/245 |
| 2010/0023194 A1* | 1/2010 | Okubo et al. | 701/22 |

FOREIGN PATENT DOCUMENTS

| | | |
|---|---|---|
| EP | 1124322 A2 | 8/2001 |
| EP | 1124322 A3 | 8/2001 |

* cited by examiner

*Primary Examiner* — Karen Masih
(74) *Attorney, Agent, or Firm* — Cantor Colburn LLP

(57) ABSTRACT

A motor control system for controlling two or more motor groups includes a power converter that receives power from a power source and converts the power to an intermediate power and an intermediate power link coupled to the power converter. The motor control system also includes at least one motor driver coupled to the intermediate power link configured to provide power to one or more motors and a controller coupled to the power converter and the at least one motor driver. The controller is configured to cause the at least one motor driver to limit the amount of power delivered to the one or more motors based on the amount of power that the power converter can produce.

15 Claims, 6 Drawing Sheets

POWER CONTROL ON A MULTI-MOTION ELECTRIC DRIVE SYSTEM

BACKGROUND OF THE INVENTION

The subject matter disclosed herein relates to motor control and, in particular, to controlling multiple motors in a multi-motion system during times of reduced power or grid fluctuation.

A typical motor control system includes a power converter that converts power from a power source (typically after being stepped down by a transformer) into an intermediate form and provides it to an intermediate link. A motor driver utilizes the power from the intermediate link to control, for example, the operation of an electric motor. In particular, the motor driver (typically implemented as an inverter or chopper) transforms the fixed voltage or current source or link power to a variable frequency and magnitude voltage or current for supply to a motor driving a load.

The power flow from or to the power source is limited by factors such as the impedance between the power source and the power converter, the voltage of the power source during operation, the temperature of the power converter and the instantaneous capability thereof as well as the voltage capability (constraints) of the power converter and the power source.

It has been discovered that fluctuations or reductions in the power from the power source may commonly exist and are beyond of the control of the motor control system. These situations may lead a situation where the intermediate link collapses. Such a collapse may cause the motors to become inoperable and require a restart.

BRIEF DESCRIPTION OF THE INVENTION

According to one aspect of the invention, motor control system for controlling two or more motor groups is provided. The system of this aspect includes a power converter that receives power from a power source and converts the power to an intermediate power and an intermediate power link coupled to the power converter. The motor controller also includes at least one motor driver coupled to the intermediate power link configured to provide power to one or more motors and a controller coupled to the power converter and the at least one motor driver. The controller is configured to cause the at least one motor driver to limit the amount of power delivered to the one or more motors based on the amount of power that the power converter can produce.

According to another aspect of the invention a method of controlling motor power in a system including a first motor is provided. The method of this aspect includes receiving a reduced motor power limit for the first motor; based on the reduced motor power limit, calculating a reduced torque limit; and controlling power to the first motor such that the reduced torque limit is not exceeded.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
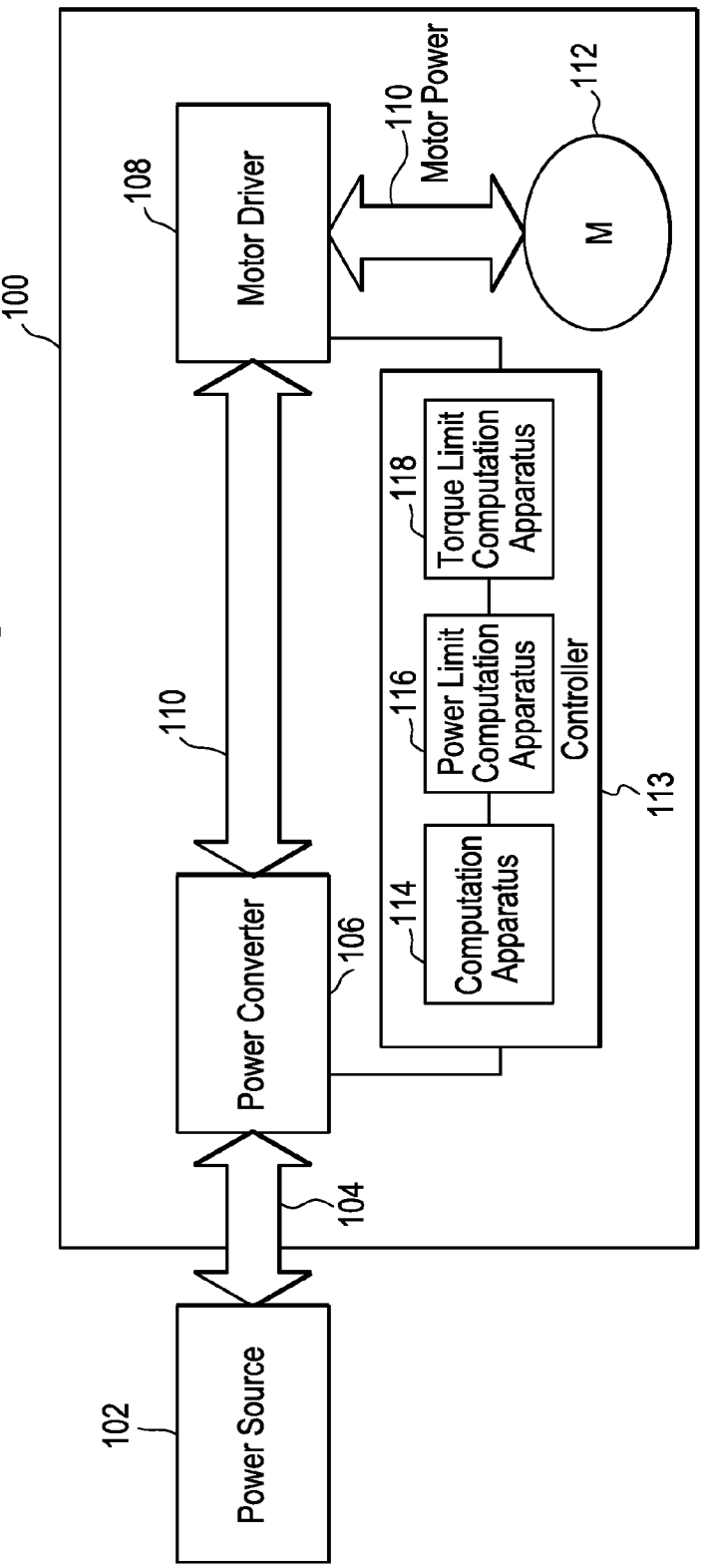
FIG. 1 is block diagram of a motor control system according to one embodiment of the present invention coupled to a power source.

FIG. 1 shows a block diagram of a motor control system 100 according to one embodiment of the present invention. The motor control system 100 is shown coupled to a power source 102.

The system 100 may be, for example, a motion system for an electric excavator. Of course the teachings herein may be applied to any motor control system (with or without a power converter) where a power-limiting interface may be needed for operation.

The power source 102 may be any type of power source that provides electrical power. For example, the power source 102 may be a battery. The power source 102 could also be any AC power source including, but not limited to, a power generation plant or a sub-station connected thereto. The power source 102 may produce, in one embodiment, 3-phase AC power.

The power source 102 is coupled to the system 100 by transmission system 104. The transmission system 104 may include a transformer to convert the power to a desired level.

The system 100 may include a power converter 106 coupled to a motor driver 108 via a power link 110. The power converter 106, generally, receives power from the transmission system 104 and provides it to the motor driver 108 via the power link 110. In more detail, the transmission system 104 provides power at a desired level to the system via power converter 106. The motor driver 108 controls the flow of power to and from one or motors 112 attached thereto by motor power link 110. The system 100 may also include a controller 113 that may vary the operation of the motor driver 108 based on operation of the power converter 106 or other factors.

The power converter 106 may, in one embodiment, be omitted. In such an embodiment, power may be provided directly to motor driver 108.

As disclosed herein, it has been discovered that by limiting the power at the motor 112, the power converter 106 output (current or voltage) may be directly limited. Limiting the output of the power converter 106 may aid in matching operation of the power converter 106 to varying conditions presented by the power source 102. In addition, for current-controlled power-converters 106 with a set peak current limit (e.g., an Active Front End (AFE)), changing the power limit prevents undesirable effects such as collapse of the power link 110 and sudden shut down of the system 100, by directly controlling the level of power demand from the source 102 through the converter 106.

In applications involving one or two power converters 106 feeding many motions, each of which consists of one or many motors 112 driven by motor drivers 108, embodiments of the present invention may involve the computation a power limit for each motor or motion. The motor drivers 108 may provide the reduce power consumption rate (derate) to their own motors 112 based on the ratio of their power consumption as compared to the total power consumption at a given point in time. Furthermore, the motor drivers 108 may be provided acceleration factors settable from a controller 113 for the derate at each motor 108 that can be used to accelerate the derating of one motion with respect to another.

In one embodiment, the system 100 may limit the power in a motor driver system 100 by utilizing the controller 113. In more detail, the controller 113 may include a converter/power supply power limit computation apparatus 114 that determines whether the power converter 106 is approaching the peak of its capability under the given operating conditions as well as the capability of the system 100. The operating conditions may include, for example, the voltage levels of a power source 102. Thus, the peak for the power converter 106 may vary as input power conditions varies ensuring that the system 100 is responsive to input power fluctuations.

The controller 113 may also include a power limit computation apparatus 116 that translates the power limit into one or both of a motoring and regenerative power limit to be applied at the motor drivers 108. The controller 113 may also includes a torque limit computation apparatus 118 that translates the power limits into torque limits determined by the operating conditions of the motor.

Figure 2:
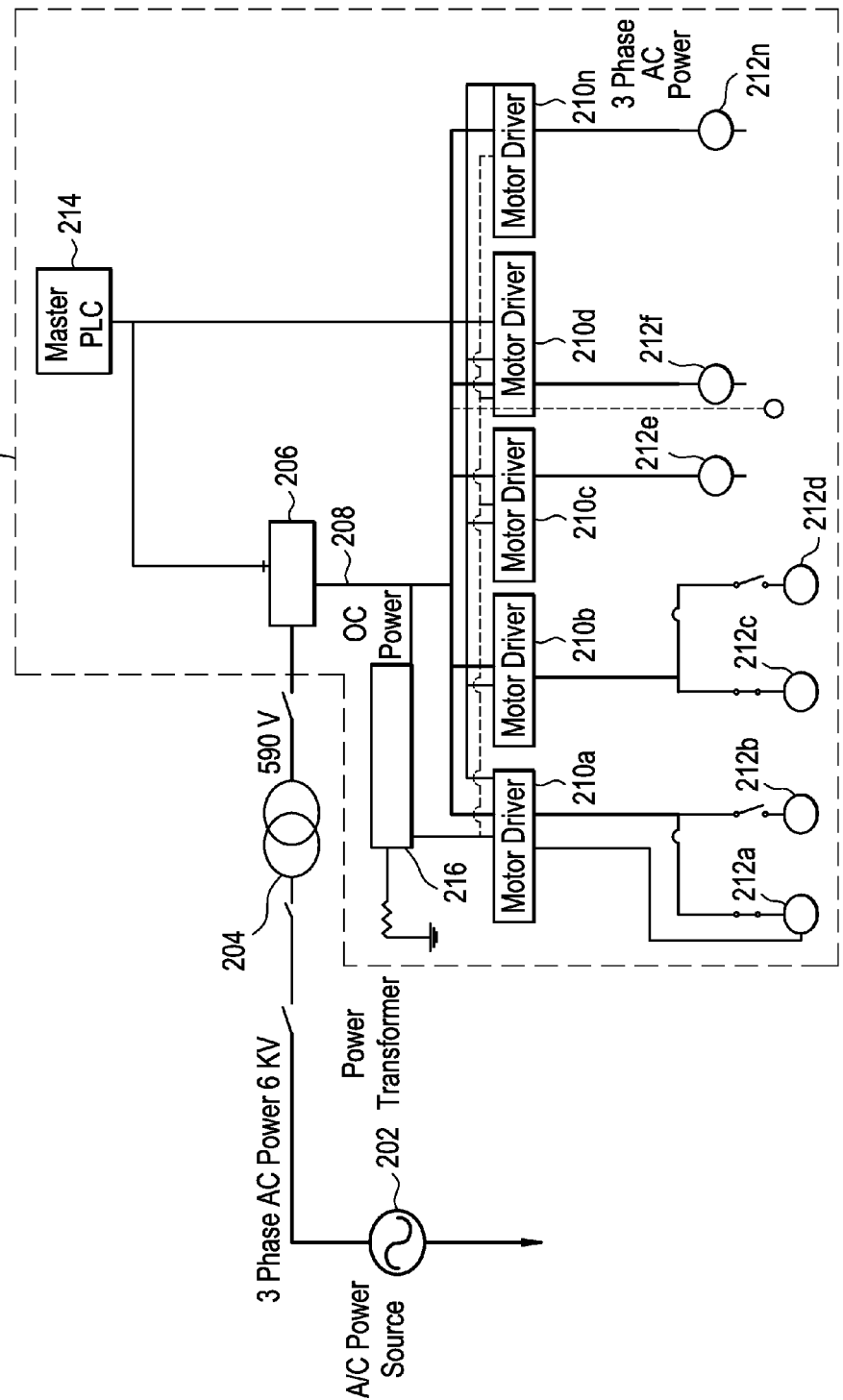
FIG. 2 is a more detailed diagram of a specific implementation of a motor control system according to one embodiment coupled to a power supply.

FIG. 2 shows a more detailed depiction of a specific implementation of a motor control system 200 according to one embodiment. The motor control system 200 is coupled to a power supply 202. It shall be understood that the following description is based on the system 200 as shown in FIG. 2. Of course, the configuration of the system 200 is not limited to this example.

The power supply 202 shown in FIG. 2 is an AC power supply providing 3-phase AC power that is transformed by a power transformer 204. The transformed AC power created by the power transformer 204 is provided to a converter 206 that converts the AC power to a DC power for transmission over a DC bus 208. Of course, in the event that the power supply 202 provides DC power, the converter 206 may be omitted.

The DC bus 208 may be coupled to multiple motor drivers 210 to control the operation of multiple motors 212. In particular, the DC bus may be coupled to motor drivers 210a . . . 210n. Each motor driver 210 may be connected to and control operation of one or more motors. For example, motor drivers 210a, 210b and 210c may be coupled to two motors, 212a-212b, 212c-212d, and 212e-212f respectively, and motor drivers 210d and 210n may be coupled to one motor, 212g and 212n, respectively. In one embodiment, one or both motor drivers 210a and 210b may control the operation of a hoist on an excavator, one or both of motor drivers 210c and 210d may control the swing of an excavator and motor driver 210 may control the crowd of an excavator.

The motor controllers 210 and the converter 206 may be coupled to and controlled by a controller 214. In one embodiment the motor controllers 210 are inverters and deliver 3-phase AC power to the motors 212. In one embodiment the DC bus 208 may be coupled to a DC chopper 216.

Figure 3:
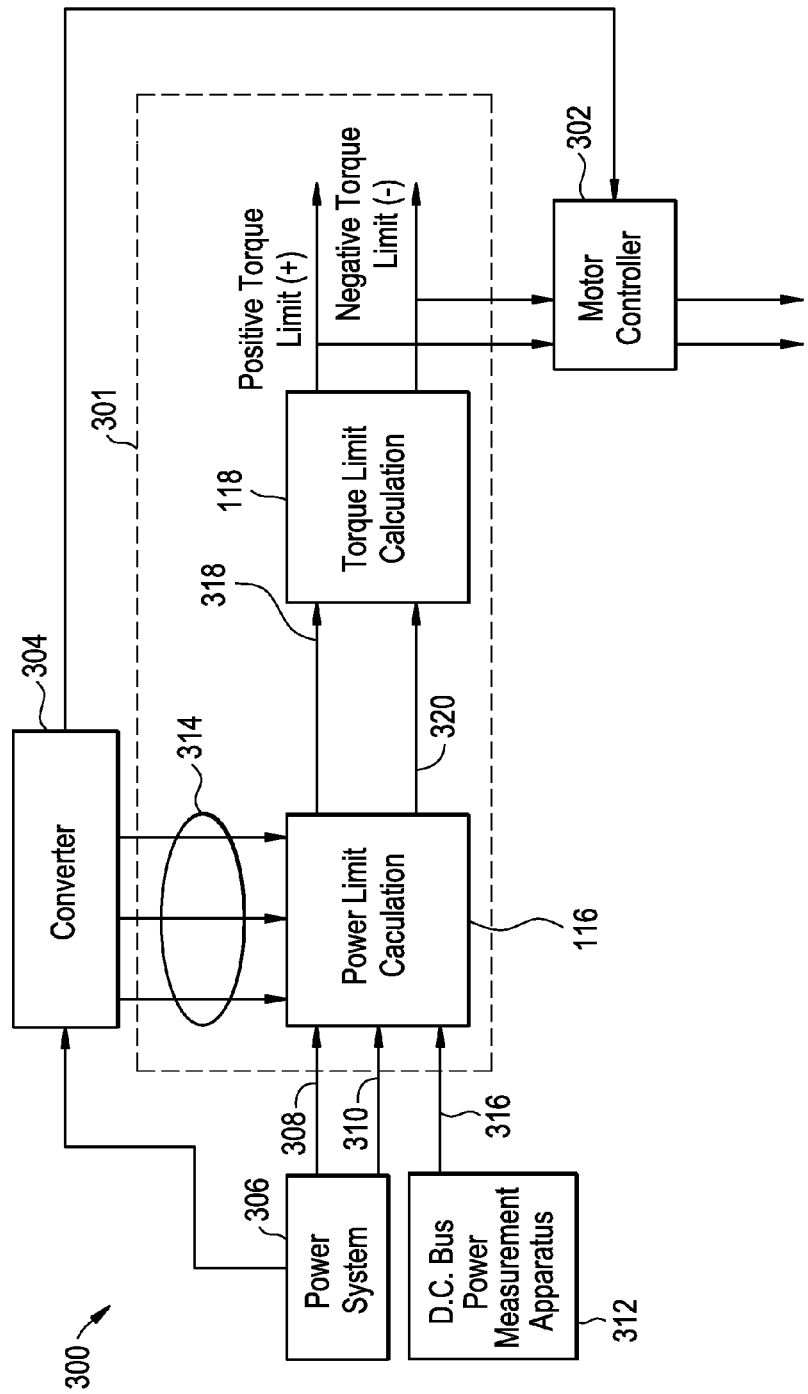
FIG. 3 shows a block diagram of multi-motor controller and details portions of a controller.

FIG. 3 shows a block diagram of system according to one embodiment. The system 300 includes a control system 300 that may be utilized to control a single motion. The control system 300 may be implemented, for example, in the controller 113 shown in FIG. 1. The control system 300 may provide operating instructions to a motor controller 302 that provides power to an electric motor (not shown). The system may include a converter 304 that receives power from a power source 306 and provides that power to the motor controller.

The power source 306 may include apparatus or means to determine its line voltage and impedance. Accordingly, the power source 306 is shown as providing a line voltage via line 308 and a line impedance via line 310 to the power limit computation apparatus 116. Of course, these values may be determined, in one embodiment, by measurement tools in the converter 304 or other locations or by using off-line data. In addition, a DC bus power measurement apparatus 312 may provide the voltage and current measurements to the power limit computation apparatus 116 via line 316. The power limit computation apparatus 116 may also receive constraints of the converter 304 from the converter 304 via one or more communication lines 314. The constraints may include, but are not limited to, converter temperature, a converter output power estimate, and converter voltage/current constraints. Some or all of the inputs received by the power limit computation apparatus 116 may be used to determine motoring and regenerative power limits for the motor. These values are provided to the torque limit computation apparatus 118. In one embodiment, the motoring power limit is provided to the torque limit computation apparatus 118 via line 318 and the regenerative power limit is provided to the torque limit computation apparatus 118 via line 320. In one embodiment, the torque limit computation apparatus 118 utilizes the motoring power limit and regenerative power limits to set the positive and negative torque limits that are used by the motor controller 302 to control motor operation.

Figure 4:
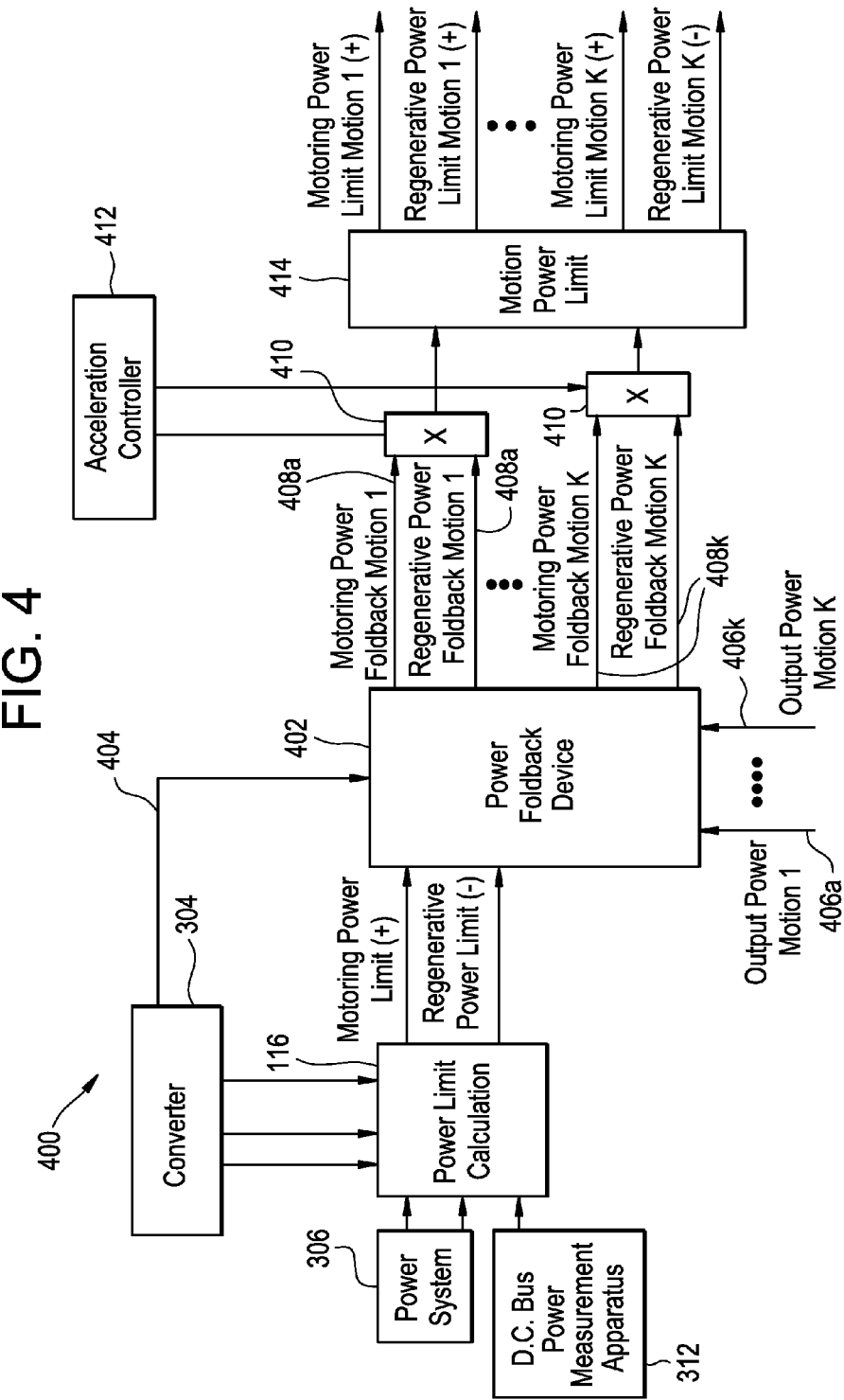
FIG. 4 shows a multi-motor controller similar to that in FIG. 3 where multiple motors may be controlled.

FIG. 4 shows a multi-motor controller 400 similar to the controller of FIG. 3 except that multiple motors may be controlled. To that end, the multi-motor controller 400 may include a power limit computation apparatus 116 coupled to the power system 306, the DC bus power measurement apparatus 312 and the converter 304, and receiving the same inputs as previously described.

In this embodiment, the motoring and regenerative power limits are provided to a power foldback device 402. The power foldback device 402 may determine, based on various inputs (including an estimated total power output from the converter 304 via line 404) and the power limits received from the power limit computation apparatus 116, how to lower motor power usage to match available power from the power source 304, even if the power is fluctuating or lower than expected. In one embodiment, the adjusted power levels causes a torque limit computation apparatus 118 (FIG. 3) to adjust the torque limits for one or more motors and as is described in greater detail below.

In one embodiment, the power foldback device 402 will reduce the power of each motor based on locations in a particular cycle. For explanation purposes, consider a three-motion excavator. At any given time, at least one of the motions is dominant to another motion. For example, when the basket of an excavator is being raised or lowered, the excavator is typically not turning. Thus, the power limit to the "turning" motor may be reduced more than the basket raising/lowering motor when total power consumption may need to be reduced.

Measured power at each of the controlled motions (each motion containing one or more motors) may be received by the power foldback device 402 via lines 406a-406k where k is the number of motions. The sum of the estimated power from all the motions is used to drive power fold-back computations for each of the motion inverters and motors. These power foldback commands (on lines 408a-408k) can be further accelerated by acceleration factors from an acceleration controller 412 (which may be part of the controller 113 of FIG. 1) added to the foldback power by acceleration factor controllers 410 to control the relative power foldback of one motion with respect to another.

The outputs of the acceleration factor controllers 410 may be provided to a motion power limit controller 414. The motion power limit controller 414 may produce, for each motion, a power limit output that is provided to a torque limit computation apparatus 118 (FIG. 3).

The above description discussed different "motions." It shall be understood that the teachings herein may be applied to any system having a motor and, in particular, to any system having multiple motors that may, during at least one time interval, have different power needs.

Figure 5:
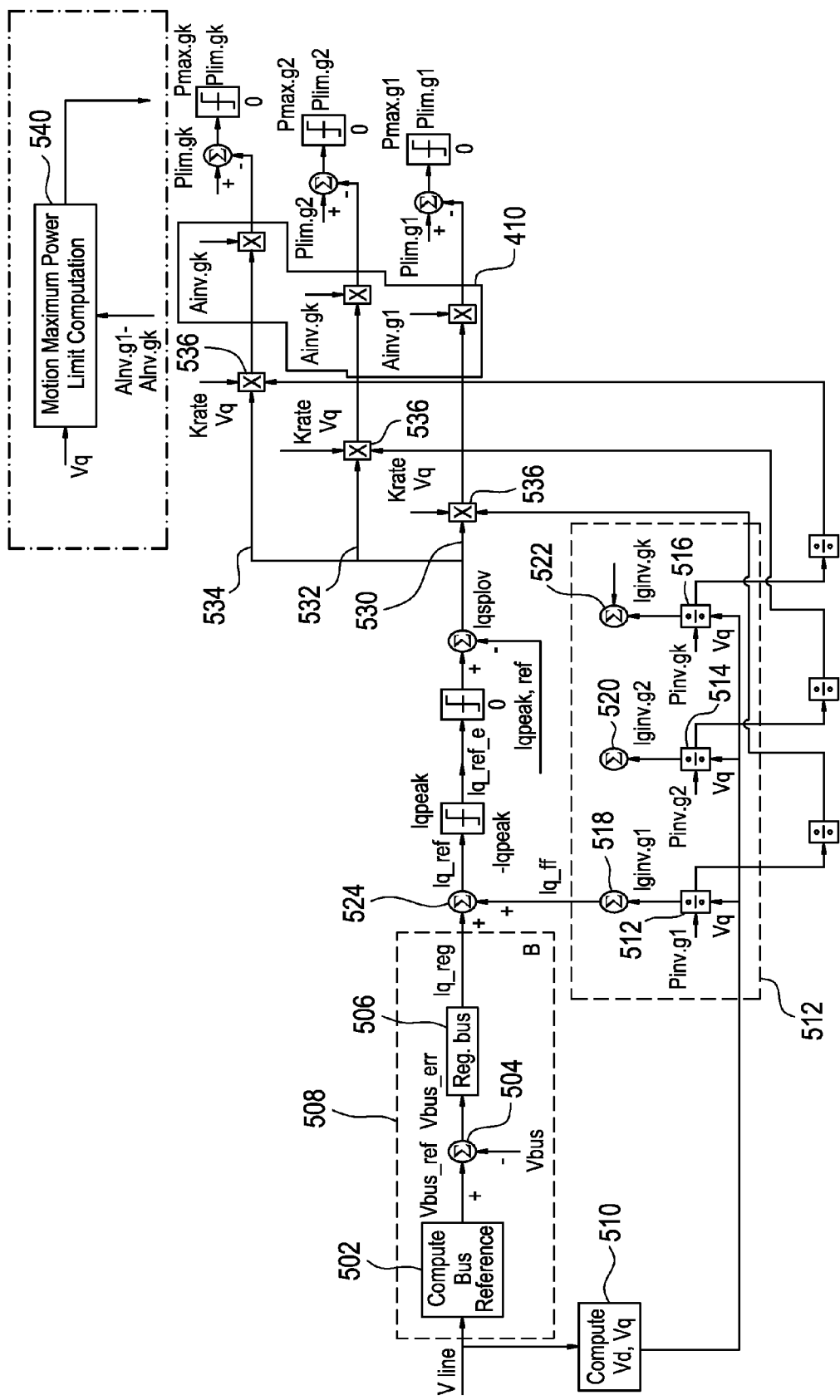
FIG. 5 shows one possible implementation of the system shown in FIG. 4.

FIG. 5 shows one possible implementation of the system shown in FIG. 4. The system shown in FIG. 5 may be used to create the motoring power limit for each motion. Of course, similar circuitry may be needed to regenerative power cases.

The system may include a bus voltage reference computation unit 502. The bus voltage reference computation unit 502 will create a reference bus voltage, Vbusref. The output of the power computation unit 502 is compared, at comparator 504, with the actual DC bus value to create a bus voltage error Vbus_err. Based on this error, a bus voltage regulator 506 creates a regulated bus current value Iq_reg. The components 502, 504 and 506 may form a voltage regulation calculation block 508 in one embodiment.

The system may also include a voltage computation block 510. The computation block 510 may be located, for example, as part of the converter 304 (FIG. 4). The computation block 510 may resolve the measured line current into direct and quadrature axis components. It may also resolve the output voltage of the controller onto the same axis. These voltages are represented by Vd and Vq in FIG. 5.

Vq may be utilized to divide the power feedback from each individual inverter group (Pinv,gx) to create the inverter current for each group Iqinv,gx. The number of groups is variable. Accordingly, in FIG. 5, Vq is provided, generally, to a feedforward current (Iff) calculation block 512. The Iff calculation block 512 creates Iff based on the power utilized by the inverters for each motion group and Vq. In more detail, Iff calculation may include dividers 512, 514 and 516 which divide the power from each group 1 to x by Vq to produce quadrature currents Iqinv,g1 to Iqinv,gx for each inverter. These quadrature currents are summed together to produce a feedforward current Iq,ff. As shown, multiple summers 518, 520 and 522 are utilized to sum these currents. Of course, other means may be employed to sum these currents.

At a summer block 524 a reference quadrature current, Iq_ref is created by summing Iq,ff with Iq_reg. This reference current (after some optional signal conditioning) may be provided to control branches for each motion. As shown in FIG. 5 there are three motions (or motor groups) having a first motion control branch 530, a second motion control branch 532 and a kth motion control branch 534. Each reference branch includes a power calculator 536 that receives the reference current, a conditioned version of Iqinv,gx (where x represent the branch for a particular motion) and Vq times a constant (Krate) which reflects a default power foldback rate.

The output of each power calculator 536 for each branch represents the motor foldback value. These values, as described above, are provided to acceleration factor controllers 410. Each acceleration factor controller 410, based on the motion profile and the state of each motion as well as safety of the application, the acceleration controller 412 (FIG. 4) selects and sets a derate acceleration for each motion.

The output of the acceleration factor controllers 410 may create, based on the current power consumption, a total power that will be used to calculate a torque limit as described below.

In summary, the summer 524 (possibly part of power converter 304; FIG. 3) sums the current corresponding to the power at all the motor driver groups with the current demand from the DC bus voltage regulator 506. Whenever this total current exceeds the peak current capability at the converter (as determined by maximum power limit computation block 540), the power limit at the motor groups is folded back so as to reduce the power demand on the power converter.

In a particular implementation, the converter could obtain the measured power as a percent of each inverter group's peak power. An inverter group's peak power value would be updated at the converter whenever the number of inverters in the group changes. The converter sends the power fold-back value to all the inverter groups as a percentage value (shown as KrateVq in FIG. 5) along with the contribution factor for each inverter group. The power fold-backs along with the contribution factor and acceleration factor from a system level controller are used to calculate the power limits for each motion axis.

Assuming that the system is sized to handle the peak currents under nominal power source conditions and specified range, the net current demand would exceed the peak reference current only when the power source voltage decreases below the nominal range. In this condition, the power converter has to compute the fold-back to be applied to the motor motions. Based on the motion profile and the state of each motion as well as safety of the application, the master controller would select and set de-rate acceleration for each motion. Accordingly, it is a technical effect of the present invention to provide power to different motions based on their individual needs, rather than a blanket power adjustment as was previously implemented.

The foregoing disclosure has focused on how power limits for individual motions (or motors) may be varied when power from the power source is reduced below a particular operating level. The following section describes how the computed power limit clamp (e.g., the output of the motion power limit controller 414 of FIG. 4) is applied to the motor drivers. In particular, the power limit clamp is used to calculate a torque limit as a function of the actual shaft speed in real-time in one embodiment. When applying the power limit at a motor driver, the losses in the motor may be accounted to help ensure that the power limit clamp produces the desired effect. This may be done conservatively using the losses corresponding to the maximum torque at a given operating speed during motoring and using zero losses during regeneration. A more complex implementation could compute the losses as a function of the torque limit in the previous instance and use that value to obtain the power limit to be used at the motor shaft.

Power limiting as disclosed herein may allow for improved performance by making more torque available for the application as compared to a typical system wide torque limit. In many implementations, the torque limit is dynamically applied as (for example) the voltage from the source dips with loading. While the torque limit acts to limit the power draw from the source by using the torque limit as a function of the measured real-time voltage level, the motor drivers experiences transient torque jumps and vibrations at the output. Such jumps may be reduced or eliminated by the teaching herein. For example, a metric corresponding to the strength of the source may be computed and used to place a steady state limit on the power output from the inverter and one of the end results may be a smoother run of the application. Furthermore, the power limiting operation is naturally gradient limited on velocity changes and hence, the application velocity changes do not occur suddenly.

Figure 6:
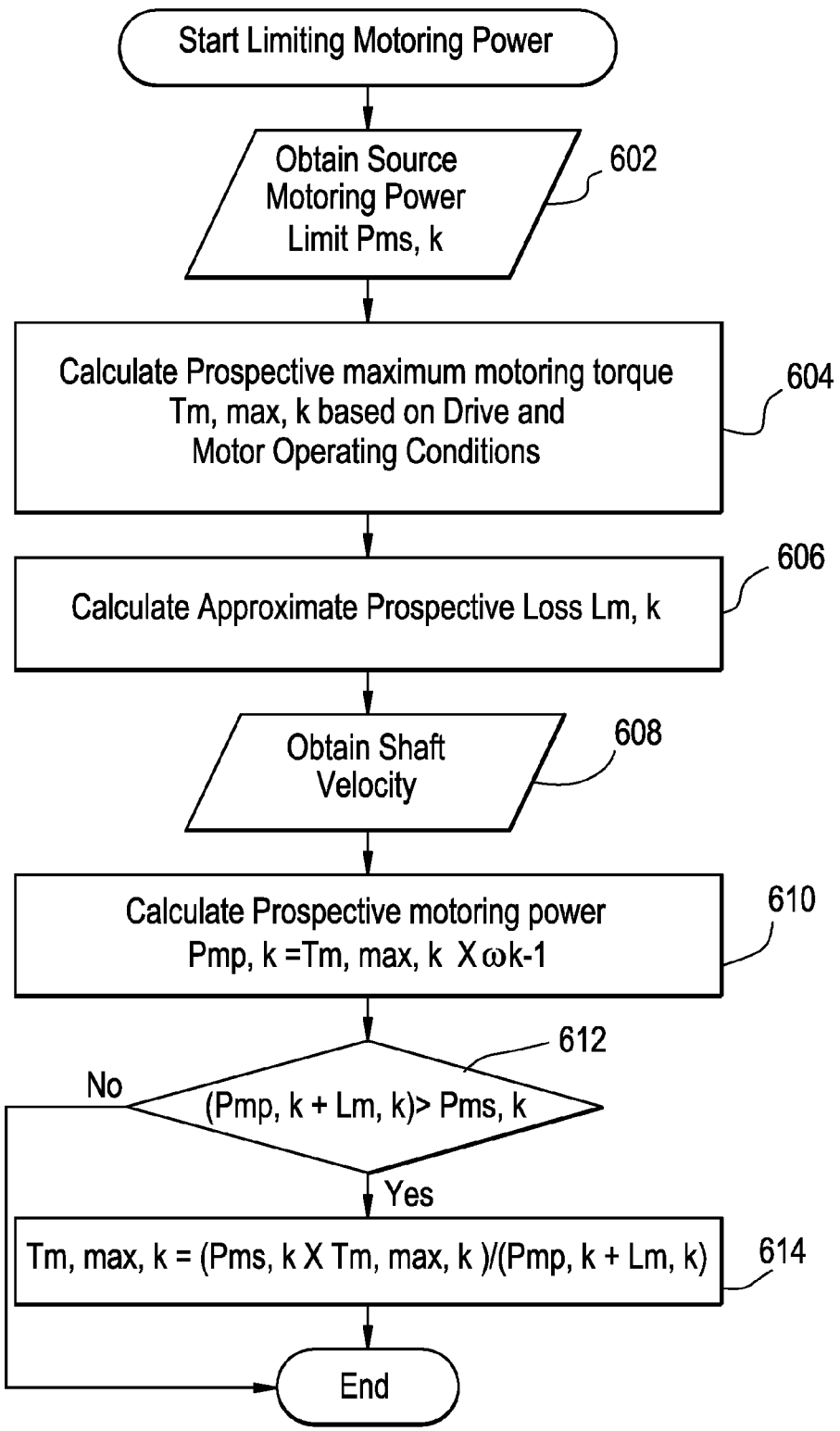
FIG. 6 shows a flow-chart of a method calculating a torque limit from power limits.

FIG. 6 shows a flow-chart of a method calculating a torque limit from the power limits described above. The method shown in FIG. 6 is for calculating torque limits during motoring. It shall be understood that a similar method may be utilized for braking.

At a block 602 the motoring power limit (Pms,k) for a particular motion is received. Pms,k may be determined as described above for one or all of k motions. At a block 604 the maximum motoring torque (Tm,max,k) is calculated based on drive and motor operating conditions. Based on current operating conditions, the loss in the particular motor may be calculated at a block 606. At a block 608 the shaft velocity of the motor is received.

Based on the shaft speed and losses, a prospective motor power Pmp,k may be calculated at a block 610. In one embodiment, Pmp,k=Tm,max,K X shaft velocity. At a decision block 612 it is determined if Pmp,k+Lm,k exceeds Pms,k. If it does, then the torque needs to be reduced. Accordingly, at a block 614, the torque is reduced. In one embodiment, the torque may be reduced according to the relation: Tm,max,k= (Pms,k X Tm,max,K)/(Pmp,k+Lm,K). In the event that Pmp,k+Lm,k does not exceed Pms,k, the process ends after block 612.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A motor control system for controlling two or more motor groups, the system including:
a power converter that receives power from a power source and converts the power to an intermediate power;
an intermediate power link coupled to the power converter;
at least one motor driver coupled to the intermediate power link configured to provide power to one or more motors; and
a controller coupled to the power converter and the at least one motor driver, the controller configured to cause the at least one motor driver to limit the amount of power delivered to the one or more motors based on the amount of power that the power converter can produce, the controller including supply power limit computation apparatus that calculates a peak capability of the power converter and a power limit calculation apparatus configured to create a power limit based on the peak capability.

2. The motor control system of claim 1, wherein the supply limit computation apparatus calculates the peak capability based on power received from a power supply.

3. The motor control system of claim 1, wherein the power limit computation apparatus creates a motoring power limit and a braking power limit.

4. The motor control system of claim 1, wherein the power limit is based on a converter output temperature, a converter output power estimate and converter power production constraints.

5. The motor control system of claim 1, wherein the controller also includes:
a torque limit calculation apparatus that translates the power limit into torque limits determined by the operating conditions of the motor groups.

6. The motor control system of claim 5, wherein the operating conditions include losses and shaft velocity.

7. The motor control system of claim 1, wherein the intermediate power link is a direct current, DC, bus.

8. The motor control system of claim 1, wherein the at least one motor driver is an inverter.

9. A motor control system for controlling two or more motor groups, the system including:
a power converter that receives power from a power source and converts the power to an intermediate power;
an intermediate power link coupled to the power converter;
at least one motor driver coupled to the intermediate power link configured to provide power to one or more motors and that includes a first motor driver and a second motor driver both coupled to the intermediate power link; and
a controller coupled to the power converter and the at least one motor driver, the controller configured to cause the at least one motor driver to limit the amount of power delivered to the one or more motors based on the amount of power that the power converter can produce, wherein the controller includes:
a power limit calculation apparatus configured create a power limit based on a peak capability of the converter; and
a power foldback device coupled between the power limit calculation apparatus and the first and second motor drivers, the power foldback device creating foldback power limits for the first motor drive and the second motor drive based on the power limit and the measured output power of the first and second motors drivers.

10. The motor control system of claim 9, wherein the controller further includes:
an accelerator coupled between the power foldback device and the first motor driver that accelerates the foldback power limit based on a current location in a cycle that utilizes the first and second motor drivers.

11. The motor control system of claim 10, wherein the controller further includes:
a motion power limit apparatus that receives inputs from the accelerator and provides an adjusted power limit for the first motor driver.

12. The motion control system of 11, wherein the controller further includes:
a torque calculation apparatus coupled to the motion power limit apparatus that translates the adjusted power limit into a torque limit determined by the operating conditions of the motor.

13. A method of controlling motor power in a system including a first motor, the method comprising:
receiving a reduced motor power limit for a the first motor;
based on the reduced motor power limit, calculating a reduced torque limit, wherein calculating includes determining a maximum torque limit based on the motor operating conditions and calculating prospective motor loss; and
controlling power to the first motor such that the reduced torque limit is not exceeded.

14. The method of claim 13, wherein power is provided to the first motor by a motor controller that monitors a torque produced by the first motor.

15. The method of claim 13, wherein the calculating further includes:

setting the reduced torque limit based on the maximum torque limit and the prospective motor loss.

* * * * *